United States Patent
Hughes et al.

(10) Patent No.: US 8,300,536 B2
(45) Date of Patent: Oct. 30, 2012

(54) SYSTEM AND METHOD FOR PROVIDING REAL TIME INDICATOR OF VOICE TRANSMISSION QUALITY

(75) Inventors: Robert C. Hughes, Pleasantville, NY (US); Andrew L. Massey, Madrid (ES); Frederic G. Surand, Pringy (FR)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 11/843,053

(22) Filed: Aug. 22, 2007

(65) Prior Publication Data
US 2008/0080484 A1    Apr. 3, 2008

(30) Foreign Application Priority Data
Aug. 23, 2006   (EP) .................................... 06017522

(51) Int. Cl.
*H04L 1/00* (2006.01)
(52) U.S. Cl. ................. 370/236; 379/26.01; 379/27.02; 379/27.03; 379/27.04
(58) Field of Classification Search .................. 370/252, 370/352, 353, 356, 389, 392, 400, 401, 402, 370/232, 253, 235, 236; 379/1.03, 1.04, 379/26.01, 27.01, 27.02, 27.03, 27.04; 704/220, 704/231, 233
See application file for complete search history.

(56) References Cited

U.S. PATENT DOCUMENTS

| | | | | |
|---|---|---|---|---|
| 7,197,010 B1 * | 3/2007 | Berstein et al. | ............... | 370/252 |
| 7,756,484 B2 * | 7/2010 | Topaltzas et al. | .......... | 455/67.14 |
| 2002/0167937 A1 | 11/2002 | Goodman | | |
| 2004/0059572 A1 * | 3/2004 | Ivanic et al. | .................. | 704/236 |
| 2004/0165570 A1 * | 8/2004 | Lee | ............................... | 370/349 |
| 2004/0190494 A1 * | 9/2004 | Bauer | ........................... | 370/352 |
| 2004/0208186 A1 * | 10/2004 | Eichen et al. | ................. | 370/401 |
| 2005/0141493 A1 * | 6/2005 | Hardy et al. | .................. | 370/356 |
| 2006/0221849 A1 * | 10/2006 | Wu et al. | .......................... | 370/252 |
| 2006/0221942 A1 * | 10/2006 | Fruth et al. | .................... | 370/356 |
| 2006/0223562 A1 * | 10/2006 | Mathis | .......................... | 455/518 |
| 2009/0175188 A1 * | 7/2009 | Hardy et al. | .................. | 370/252 |

* cited by examiner

*Primary Examiner* — Hassan Phillips
*Assistant Examiner* — Ajay Cattungal
(74) *Attorney, Agent, or Firm* — Andrea Bauer; Hoffman Warnick LLC

(57) ABSTRACT

A method for providing real time indicator of voice transmission quality in a Voice over Internet Protocol (VoIP) network is disclosed. The method allows to receive, at regular time interval during a call, a digital signature from a source call device. The received signature is compared to a referential signature stored on the destination devices, and in case the received signature falls out of the referential signature, a quality indication message is transmitted back to the source call device.

18 Claims, 2 Drawing Sheets

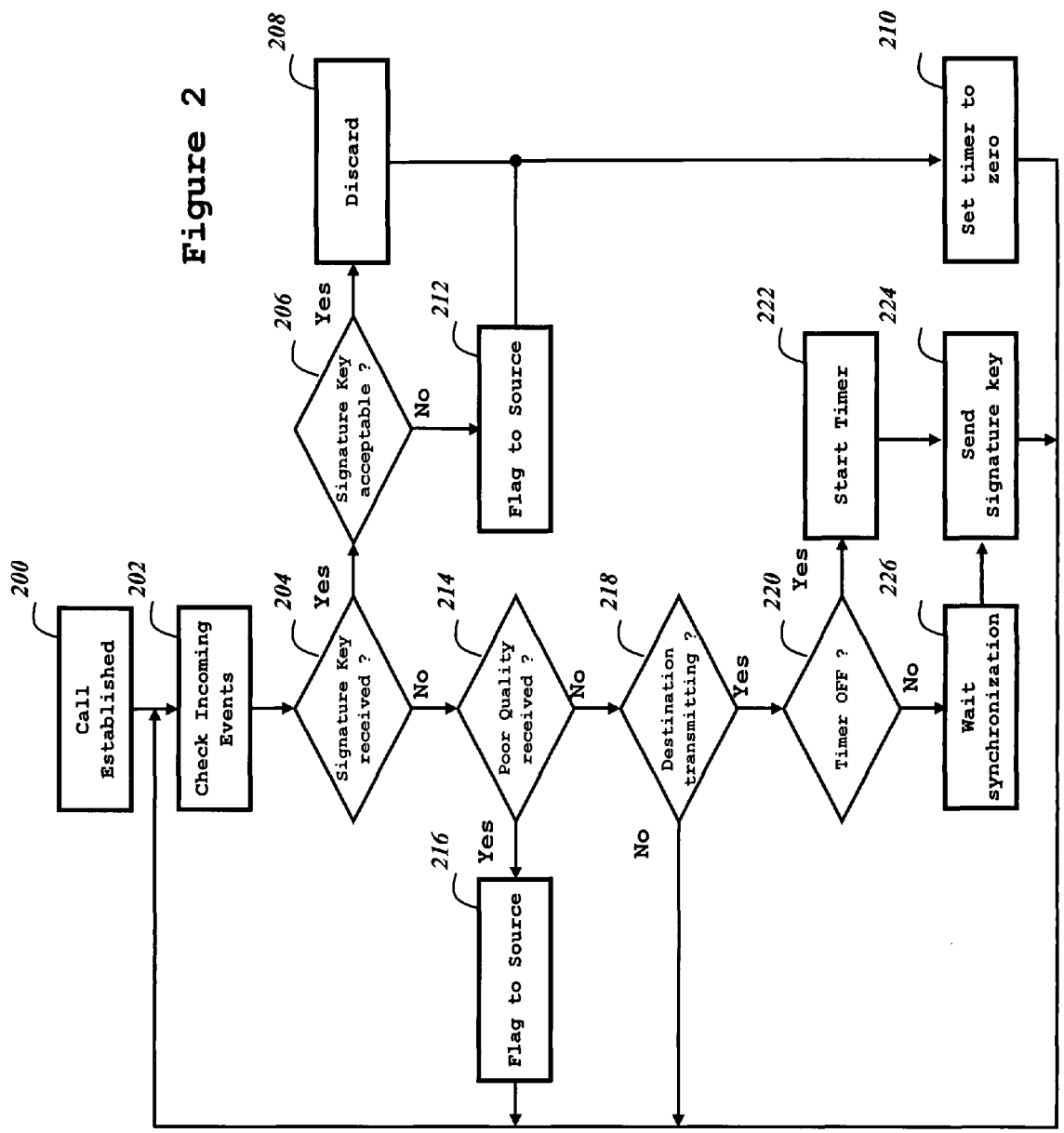

SYSTEM AND METHOD FOR PROVIDING REAL TIME INDICATOR OF VOICE TRANSMISSION QUALITY

FIELD OF THE INVENTION

The present invention relates generally to the field of Voice over Internet Protocol (VoIP) technology, and more particularly, to a system and method for providing a real time indicator of voice transmission quality.

BACKGROUND OF THE INVENTION

Voice over Internet Protocol (VoIP) is a form of Internet telephony. In an Internet telephone call, an analogue voice signal is converted to digital format and the signal is compressed into Internet protocol (IP) packets for transmission over the Internet.

Like other data networks, VoIP transfers the data packets via different ways, but not always fast enough, which may lead to transmission leakage or distortion.

This technology allows a group of people to make telephone calls using a broadband Internet connection instead of a regular (or analogue) phone line. As explained above, one significant difference to traditional telephony is the technique used to transmit voice data. Instead of the classic voice switching technology, VoIP uses data packet transmission to send information and directs only the "data packets" of voice information to their destination.

This technology often uses the infrastructure of an already existing network by sharing it with other communication services. To this extent, since the VoIP network has to deal with the complexity of numerous network measures, like data packet protection or compression, it is necessary to ensure the secure traffic of the information against attackers.

The introduction of such measures to the VoIP network complicates several aspects of VoIP performance and in particular the dynamic port traffic and call setup procedures. In addition, to avoid intruders compromising the VoIP network, some other layers of defense are necessary to protect the voice traffic. Such layers of defense are factors that need to be included at the IP level, like encryption techniques, security signature and the like. Thus, it is mandatory to protect the traffic network.

However, these additional factors cause an excessive amount of latency in the VoIP packet delivery and degrade the Quality of Service (QoS) that is a fundamental point to the operation of the VoIP network. This can lead to a degraded voice quality together with an unceasing tradeoff adjustment between security and voice quality. Unfortunately, due to the time-critical nature of the VoIP, the implementation of corrective measures considerably degrades the quality of the voice transmission. These measures impact the inherent latency of the VoIP protocol (i.e., the time it takes for a voice transmission to go from its source to its destination).

Without entering into the details of the VoIP protocol, it is important to mention that the latency is a genuine constraint that impacts both the VoIP performance and the transfer quality. Ideally, the latency value has to be set as low as possible to successfully emulate the QoS of today's telephones.

Since the data packets "travel" across the Internet, there exists also a potential risk of dropouts and an undesirable generation of clipping during a VoIP voice transmission. Such effects, combined with the genuine constraints (as explained herein above), make it difficult to provide acceptable voice quality during a call.

An end user (particularly if he/she is a speaker) is completely unaware of the voice quality level when speaking. At worst, the speaker's voice may be completely garbled to the receiving parties as the speaker continues speaking with no indication of any voice reception problem. The speaker would only become aware of a problem when he/she stops speaking and is told by others of the poor quality during the call. This is particularly a problem for conference calls as the presenter is unaware that he/she can't be understood, leaving him/her speaking for many minutes while receiving no indication of a poor voice quality.

There exist several real-time monitoring systems available on the market today such as the WinEyeQ call monitor/protocol analyser from Touchstone Inc. This type of system provides a solution for monitoring call performance in terms of successful/failed calls. However, this type of system does not provide to the end user a real-time indication of the voice quality during the call.

US20020167937A1 to Goodman describes a method for testing voice call quality in a VoIP network. The method includes enabling a communications device connected to the VoIP network to answer a test call received over the VoIP network by playing a voice file, generating a test call over the VoIP network to the communications device, and measuring voice call listening quality from the voice file played by the communications device. While this solution provides a measure of the voice quality on a test call, it does not provide to the speaker a real-time indication of the voice quality during a live call.

Thus, there is a need for a system and method that informs in real-time the caller and the listeners in a Voice over Internet Protocol network of the quality of the voice communication.

SUMMARY OF THE INVENTION

The present invention is directed to a real time indicator that is configured to warn a speaker that the voice quality of an a VoIP communication is degraded.

In a first embodiment, there is provided a method for reporting a quality of a voice transmission over a Voice over Internet Protocol (VoIP) network from at least one destination device to a source call device, comprising: receiving, at the at least one destination device, at regular time intervals during a call, a digital signature from the source call device; comparing the received signature to a reference signature stored on the at least one destination device; and transmitting a quality indication message to the source call device when the received signature falls out of a predefined range of the reference signature.

In other embodiments, a system and a computer program product for implementing the above-described method are provided.

BRIEF DESCRIPTION OF THE DRAWINGS

These and other features will be more readily understood from the following detailed description taken in conjunction with the accompanying drawings.

FIG. 2 is a flowchart of a method of the present invention run on an IP client device.

DETAILED DESCRIPTION OF THE INVENTION

Figure 1:
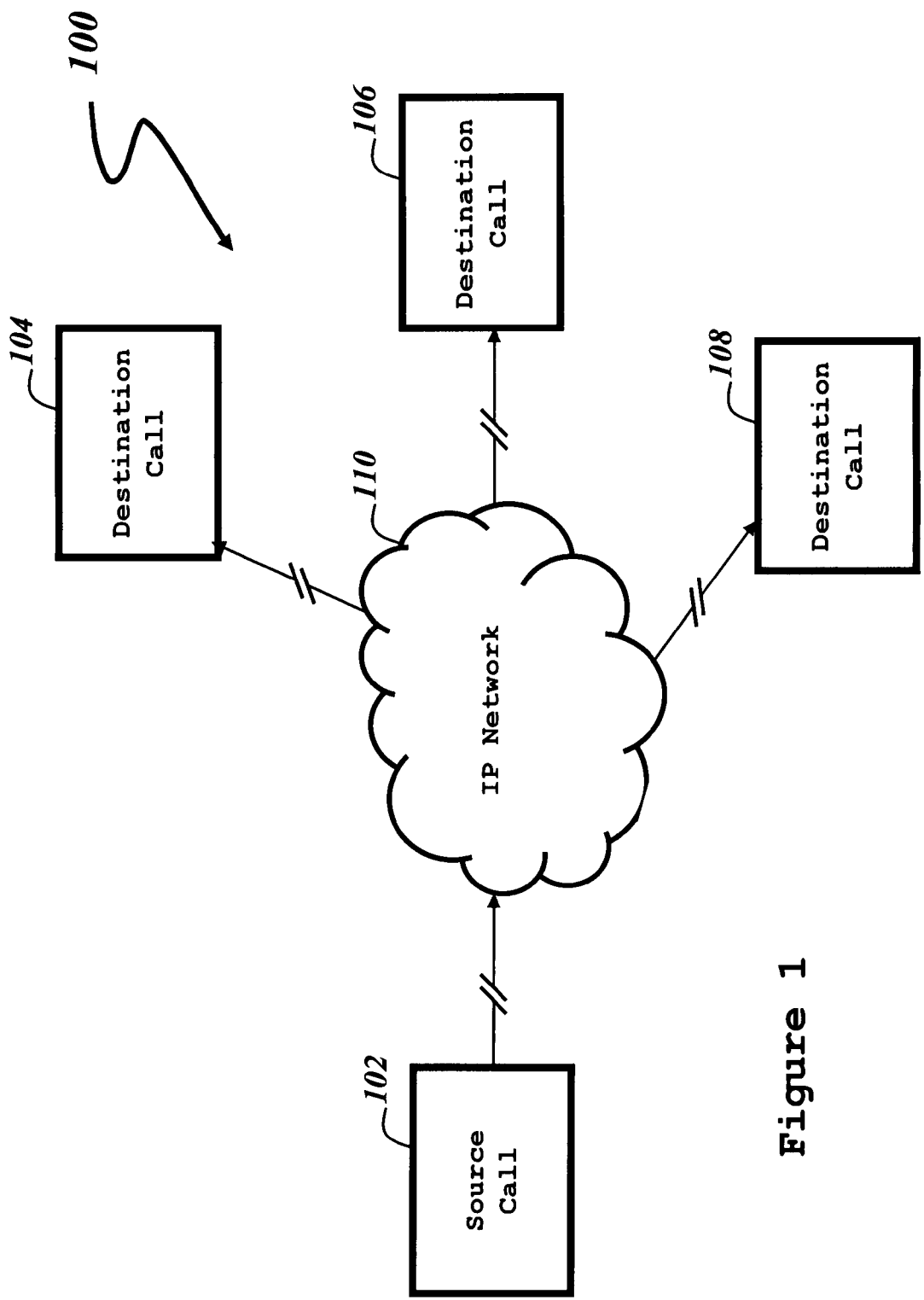
FIG. 1 shows a high level symbolic view of a network environment of the present invention.

Referring now to the drawings, FIG. 1 depicts a high level view of a Voice over IP network 100. A source call IP device 102 initiates a voice communication call to one or a plurality of destination call IP devices 104, 106, 108 over an IP network 110. The source and the destination call devices 104, 106, 108 may be hardware phones, a personal computer with IP software, or any equivalent device that allows an IP based voice communication. It is to be appreciated that for description purposes only, FIG. 1 shows a very simplified IP network 110. However, a person skilled in the art could devise any alternative, for example a direct or indirect connection between the IP devices, a direct connection through the IP network, through another type of network such as a LAN, etc. Moreover the particular details of the connections between the source and the destination call devices 102, 104, 106, 108 and the IP network 110 are not described here, but are within the purview of a person skilled in the art.

The quality level control protocol monitors the transmission of the voice data packets using a broadband Internet connection or an equivalent IP network by generating and analysing a plurality of parameters that qualify the initiated telephone call. The parameters may include information on the source of the call, the destination of the call and the data packets transmitted, but also on the traffic nature of the initiated telephone call.

Generally speaking, the quality level control mechanism is based on an interactive process and is configure to:

generate and transmit a signature data packet called a signature key to a destination call device 104, 106, 108 when operating as a source call device 102; and receive an ongoing signature key and transmit a voice quality analysis to the source call device 102 when operating as a destination call device 104, 106, 108.

The signature key generated at the source call device 102 is a unique data packet generated or computed from the digitizing voice stream by any currently available method (not described in this document) such as a CRC method, a hashing method, or any other signature computing method known to one skilled in the art (e.g., a MD5 signature generation).

At the receiving side, the incoming signature key is compared to a reference signature. The reference signature is pre-coded into a software agent of the destination call device 104, 106, 108 and contains a range of values that determines the acceptable/unacceptable quality level of the communication in real time by comparing all along the telephone call the current voice quality to the predefined range of values. The range of values is application specific and can vary accordingly. For example, the range of values can comprise, for example, values within a predetermined percentage of a desired value.

If the signature key falls within the predefined range, the signature key is discarded and no warning action is initiated. If, however, the signature key falls outside of the predefined range, a warning action is started. The destination call device 104, 106, 108 reports back to the source call device 102 the voice quality currently transmitted by the source call device 102 and an appropriate flag indicator is set up in real time on the source call device 102.

The flag indicator may comprise, for example, without limitation to any other signalling flag:

a lamp on a telephone system;

a message on a telephone display screen;

an audible or visible indicator of any kind on a computer device being used as the source call device;

an audible voice "whisper" alert;

an audible tone; and/or a progressive colour LED that indicates by a colour range the voice quality from "acceptable" to "unacceptable".

Many other types of flag indicators are possible.

At the destination call device 104, 106, 108, the quality voice control mechanism checks the incoming data packet representing the signature key that is transmitted by the source call device 102. One implementation is to use an internal loop clock like a Phase Locked Loop clock (a well-known PLL not described here). The software agent at the destination call device 104, 106, 108 is thus able to sense in real time the signature key that is then checked and validated against the reference signature. Furthermore, the control protocol also allows the owner of the ongoing transmission to be defined.

It is to be appreciated that the reliability of the signature key can depend on the data packet duration. Defining an adequate duration trade off is necessary to have the signature key not affected by any factor that could degrade the IP telephony, such as latency or jitter or any known delay variation. Moreover, the signature key duration has to be chosen short enough to correctly run and reduce some undesirable intrinsic fails.

FIG. 2 depicts a high level flowchart of a control process as defined by the present invention. On a first step 200, a call is established between a source call device and at least one destination call device, thereby initializing the signature mechanisms embedded into each software agent of the devices.

Next, on step 202, the signature process enters a conditional loop to check for successive incoming events. Specifically, on step 204 the destination call device checks for the reception of an incoming signature key. If no signature key is received, the process goes to a next check on step 214, otherwise the process goes to step 206.

On step 206, the incoming signature key issued from the source client is compared to the stored reference signature, on which is coded a set of predefined threshold values. If the comparison shows that the signature falls within the predefined threshold values, meaning that the quality is acceptable (branch Yes), then on step 208 the signature key received is discarded, and the process goes to step 210 to reset a timer counter. Details on the timer counter are provided below.

If the comparison shows a deviation from the predefined threshold values, meaning a degraded voice quality (branch No), then a quality indicator is reported back to the source call device (step 212), and the process goes to step 210.

As already explained, there exist different possibilities to provide the real time indicator of degraded voice transmission quality to the source call device. Moreover, in alternate embodiments the reporting flag may includes detailed information about the exact deviation that is detected.

Going back to step 204, if no signature key is received, the process goes to step 214 to check if a quality indicator is received. In case of such indication (branch Yes), then the process goes to step 216 where a quality indicator is reported back to the source call device. The process loops back then to step 202.

It is to be appreciated that the present mechanism is suitable to manage a conference call on which a plurality of IP Clients receives a correct signal while other ones detect a poor voice quality. To manage such configuration, an implementation relies on the use of a weighting round robin algorithm (not described here as being a well-known process). One advantage of using a round robin mechanism is to allow a selective detection and reporting of a poor quality transmission.

Going back to step 214, if no quality indication is received (branch No), then the process goes to step 218 to check if the current IP device is transmitting, thereby becoming a source call device.

If the current IP device is in transmission mode (branch Yes), then the process continues with step 220, otherwise the process loops back to step 202.

Step 220 checks the status of a timer counter. The counter is set to zero when a call is established to allow synchronization operation between the source call device and destination call device(s). Depending on the counter status the signature mechanism may wait until the appropriate time occurs before initiating a signature key to the others IP Clients.

If the counter is stopped (branch Yes), then the timer is restarted (step 222) and a signature key is sent to destination call device(s) on step 224. If the counter is counting (branch No), then the process waits until the appropriate time frame on step 226 to send the signature key (step 224).

It is to be appreciated that the signature mechanism loops till the end of the current communication by sequentially checking the three conditions of steps 204, 214 and 218.

As mentioned, the counter causes the signature key to be sent at precise defined time intervals. These intervals are required to satisfy the IP telephony constraints and in particular when the signature key is transmitted on the IP network. Depending on the IP telephony system and network characteristics the interval may differ and have to be configured appropriately.

Some/all aspects of the present invention can be provided on a computer-readable medium that includes computer program code for carrying out and/or implementing the various process steps of the present invention, when loaded and executed in a computer system. It is understood that the term "computer-readable medium" comprises one or more of any type of physical embodiment of the computer program code. For example, the computer-readable medium can comprise computer program code embodied on one or more portable storage articles of manufacture (e.g., a compact disc, a magnetic disk, a tape, etc.), on one or more data storage portions of a computer system, such as memory and/or a storage system (e.g., a fixed disk, a read-only memory, a random access memory, a cache memory, etc.), and/or as a data signal traveling over a network (e.g., during a wired/wireless electronic distribution of the computer program code).

As used herein, the term "computer program code" refers to any expression, in any language, code or notation, of a set of instructions intended to cause a computer system having an information processing capability to perform a particular function either directly or after either or both of the following: (a) conversion to another language, code or notation; and (b) reproduction in a different material form. The computer program code can be embodied as one or more types of computer program products, such as an application/software program, component software/library of functions, an operating system, a basic I/O system/driver for a particular computing and/or I/O device, and the like.

It should be appreciated that the teachings of the present invention could be offered as a business method on a subscription or fee basis. For example, a service provider (e.g., a provider of cell phone service) can create, maintain, enable, and deploy a text-to-speech assist for portable communication devices, as described above.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A method for reporting a quality of a voice transmission over a Voice over Internet Protocol (VoIP) network from at least one destination device to a source call device, comprising:
   receiving, at the at least one destination device, at regular time intervals during a call from a user, a digital signature from the source call device, wherein the user of the source call device initiated the call and provides a voice stream, wherein the digital signature is generated using the voice stream of the user;
   comparing the received signature to a reference signature stored on the at least one destination device, wherein the reference signature contains a predefined range of threshold values to determine the quality level of the voice transmission;
   transmitting a quality indication message in real time to the user of the source call device who provided the voice stream when the received signature falls outside of the predefined range of the threshold values of the reference signature; and
   discarding the received digital signature when the received signature falls within the predefined range of the threshold values of the reference signal.

2. The method of claim 1, wherein the digital signature is generated at the source call device using a signature construction function on the voice stream of the user.

3. The method of claim 2, wherein the comparing further comprises:
   applying to the received digital signature a signature checking function compatible with a signature construction function used at the source call device.

4. The method of claim 1, further comprising:
   checking for an incoming quality indication message; and
   setting up a quality indicator flag on the source call device if a quality indication message is received.

5. The method of claim 4, wherein the quality indicator flag is an audible or a visible indicator.

6. The method of claim 1, further comprising:
   initiating the call between the source call device and the at least one destination call device.

7. A program product stored on a non-transitory computer readable medium, which when executed, reports a quality of a voice transmission over a Voice over Internet Protocol (VoIP) network from at least one destination device to a source call device, the computer readable medium comprising program code for:
   receiving, at the at least one destination device, at regular time intervals during a call from a user, a digital signature from the source call device, wherein the user of the source call device initiated the call and provides a voice stream, wherein the digital signature is generated using the voice stream of the user;
   comparing the received signature to a reference signature stored on the at least one destination device, wherein the reference signature contains a predefined range of threshold values to determine the quality level of the voice transmission;
   transmitting a quality indication message in real time to the user of the source call device who provided the voice stream when the received signature falls outside of the predefined range of the threshold values of the reference signature; and
   discarding the received digital signature when the received signature falls within the predefined range of the threshold values of the reference signal.

8. The program product of claim 7, wherein the digital signature is generated at the source call device using a signature construction function on the voice digital stream of the user.

9. The program product of claim 8, wherein the program code for comparing further comprises program code for:
applying to the received digital signature a signature checking function compatible with a signature construction function used at the source call device.

10. The program product of claim 7, further comprising program code for:
checking for an incoming quality indication message; and
setting up a quality indicator flag on the source call device if a quality indication message is received.

11. The program product of claim 10, wherein the quality indicator flag is an audible or a visible indicator.

12. The program product of claim 7, further comprising program code for:
initiating the call between the source call device and the at least one destination call device.

13. A computerized method for reporting a quality of a voice transmission over a Voice over Internet Protocol (VoIP) network from at least one destination device to a source call device, comprising:
receiving, at the at least one destination device, at regular time intervals during a call from a user, a digital signature from the source call device, wherein the user of the source call device initiated the call and provides a voice stream, wherein the digital signature is generated using the voice stream of the user;
comparing the received signature to a reference signature stored on the at least one destination device, wherein the reference signature contains a predefined range of threshold values to determine the quality level of the voice transmission;
transmitting a quality indication message in real time to the user of the source call device who provided the voice stream when the received signature falls outside of the predefined range of threshold values of the reference signature; and
discarding the received digital signature when the received signature falls within the predefined range of the threshold values of the reference signal.

14. The method of claim 13, further comprising:
generating the digital signature at the source call device using a signature construction function on the voice stream of the user.

15. The method of claim 14, wherein the comparing further comprises:
applying to the received digital signature a signature checking function compatible with a signature construction function used at the source call device.

16. The method of claim 13, further comprising:
checking for an incoming quality indication message; and
setting up a quality indicator flag on the source call device if a quality indication message is received.

17. The method of claim 16, wherein the quality indicator flag is an audible or a visible indicator.

18. The method of claim 13, further comprising:
initiating the call between the source call device and the at least one destination call device.

* * * * *